United States Patent
Chuang (10) Patent No.: US 7,549,257 B2
(45) Date of Patent: *Jun. 23, 2009

(54) EARTHQUAKE SHOCK DAMPER

(76) Inventor: Kuo-Jung Chuang, No. 25-1, Lane 62, Sec. 2, Chinan Rd., Taipei (TW)

( * ) Notice: Subject to any disclaimer, the term of this patent is extended or adjusted under 35 U.S.C. 154(b) by 733 days.

This patent is subject to a terminal disclaimer.

(21) Appl. No.: 11/175,149

(22) Filed: Jul. 7, 2005

(65) Prior Publication Data

US 2007/0006538 A1 Jan. 11, 2007

(51) Int. Cl.
*E04B 1/98* (2006.01)
(52) U.S. Cl. .................................... 52/167.1; 52/167.7
(58) Field of Classification Search ................ 52/167.1, 52/167.3, 167.4, 167.7–167.9, 1, 573.1
See application file for complete search history.

(56) References Cited

U.S. PATENT DOCUMENTS

| | | | | |
|---|---|---|---|---|
| 4,188,681 A * | 2/1980 | Tada et al. | .................... | 14/73.5 |
| 4,823,522 A * | 4/1989 | White | ....................... | 52/167.7 |
| 5,490,356 A * | 2/1996 | Kemeny | .................... | 52/167.7 |
| 5,528,876 A * | 6/1996 | Lu | ............................. | 52/654.1 |
| 6,226,935 B1 * | 5/2001 | Kuramochi et al. | ........ | 52/167.4 |
| 6,295,770 B1 * | 10/2001 | Sheu et al. | ................. | 52/167.1 |
| 6,799,400 B2 * | 10/2004 | Chuang | ..................... | 52/167.1 |
| 7,188,452 B2 * | 3/2007 | Sridhara | .................... | 52/167.3 |
| 7,337,586 B2 * | 3/2008 | Lin et al. | .................... | 52/167.1 |
| 2004/0000103 A1 * | 1/2004 | Chen et al. | ................. | 52/167.1 |
| 2005/0005539 A1 * | 1/2005 | Nakamura et al. | ......... | 52/167.3 |
| 2005/0108959 A1 * | 5/2005 | Powell et al. | .............. | 52/167.1 |
| 2006/0137264 A1 * | 6/2006 | Shizuku et al. | ............ | 52/167.7 |

* cited by examiner

*Primary Examiner*—Richard E Chilcot, Jr.
*Assistant Examiner*—Elizabeth A Plummer
(74) *Attorney, Agent, or Firm*—Rabin & Berdo, P.C.

(57) ABSTRACT

An earthquake shock damper has two connectors, two shaft assemblies, multiple energy absorbers, multiple spacers and multiple energy distribution assemblies. The connectors are connected to structural members of a building. The shaft assemblies are coaxially attached respectively to the connectors. The energy absorbers are mounted around the shaft assemblies, and each energy absorber has a central body and multiple extensions extending out from the central body. The spacers are mounted around the shaft assemblies, and each spacer is mounted between the central bodies of adjacent energy absorbers to define the interval between the energy absorbers. The energy distribution assemblies are attached to the extensions of the energy absorbers.

13 Claims, 11 Drawing Sheets

EARTHQUAKE SHOCK DAMPER

BACKGROUND OF THE INVENTION

1. Field of the Invention

The present invention relates to a shock damper, especially to an earthquake shock damper that is mounted in the structure of a building.

2. Description of the Prior Arts

When earthquakes occur, shock energy generated by the earthquake transmits to the structures of buildings. The shock energy may damage or destroy the structures of buildings. Therefore the structure of buildings in seismically active areas are stronger. Furthermore, earthquake shock dampers are mounted in the structure of buildings to attenuate shock energy to prevent the structure of the buildings from being damaged or destroyed. A conventional earthquake shock damper comprises multiple energy absorbers, two energy-distribution assemblies and two connectors. Each energy absorber has two ends and two sides. The energy distribution assemblies are attached respectively to the two ends of each energy absorber. The connectors are attached respectively to the two sides of each energy absorber. However, each energy absorber needs to be connected individually to the energy distribution assemblies and the connector. Individually connecting the energy absorber to the energy distribution assemblies and the connector is time-consuming. Furthermore, the energy absorbers are designed to absorb shocks by deforming during an earthquake. Furthermore, the interval between each two energy absorbers needs to be defined carefully. Defining the interval carefully is also time-consuming.

To overcome the shortcomings, the present invention provides an improved earthquake shock damper to mitigate or obviate the aforementioned problems.

SUMMARY OF THE INVENTION

The main objective of the present invention is to provide an earthquake shock damper that takes less time and is simple to assemble. The earthquake shock damper has two connectors, two shaft assemblies, multiple energy absorbers, multiple spacers and multiple energy distribution assemblies. The connectors are connected to structural members of a building. The shaft assemblies are coaxially attached respectively to the connectors. The energy absorbers are mounted around the shaft assemblies, and each energy absorber has a central body and multiple extensions extending out from the central body. The spacers are mounted around the shaft assemblies, and each spacer is mounted between the central bodies of adjacent energy absorbers to define the interval between the energy absorbers. The energy distribution assemblies are attached to the extensions of the energy absorbers.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
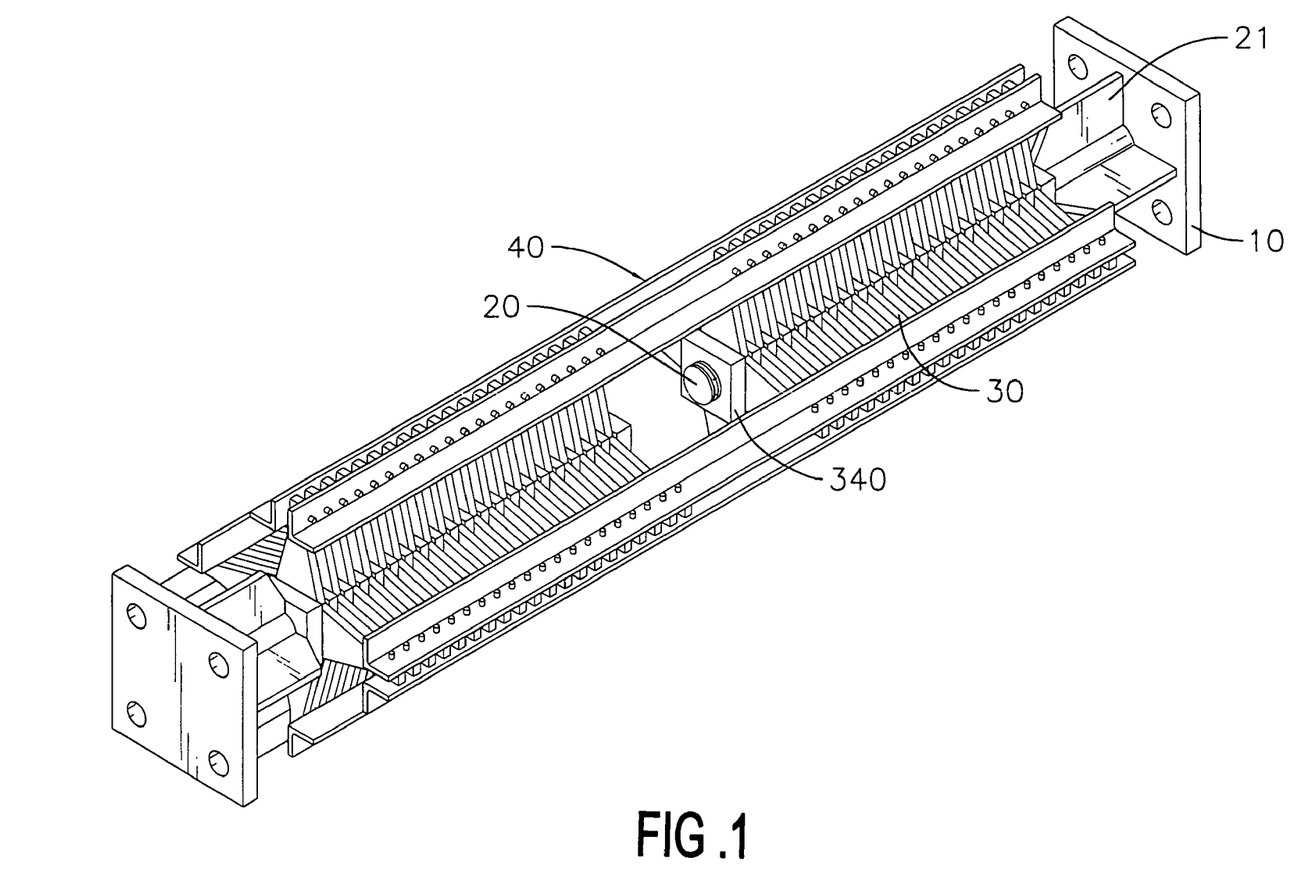
FIG. 1 is a perspective view of a first embodiment of an earthquake shock damper in accordance with the present invention.
Figure 2:
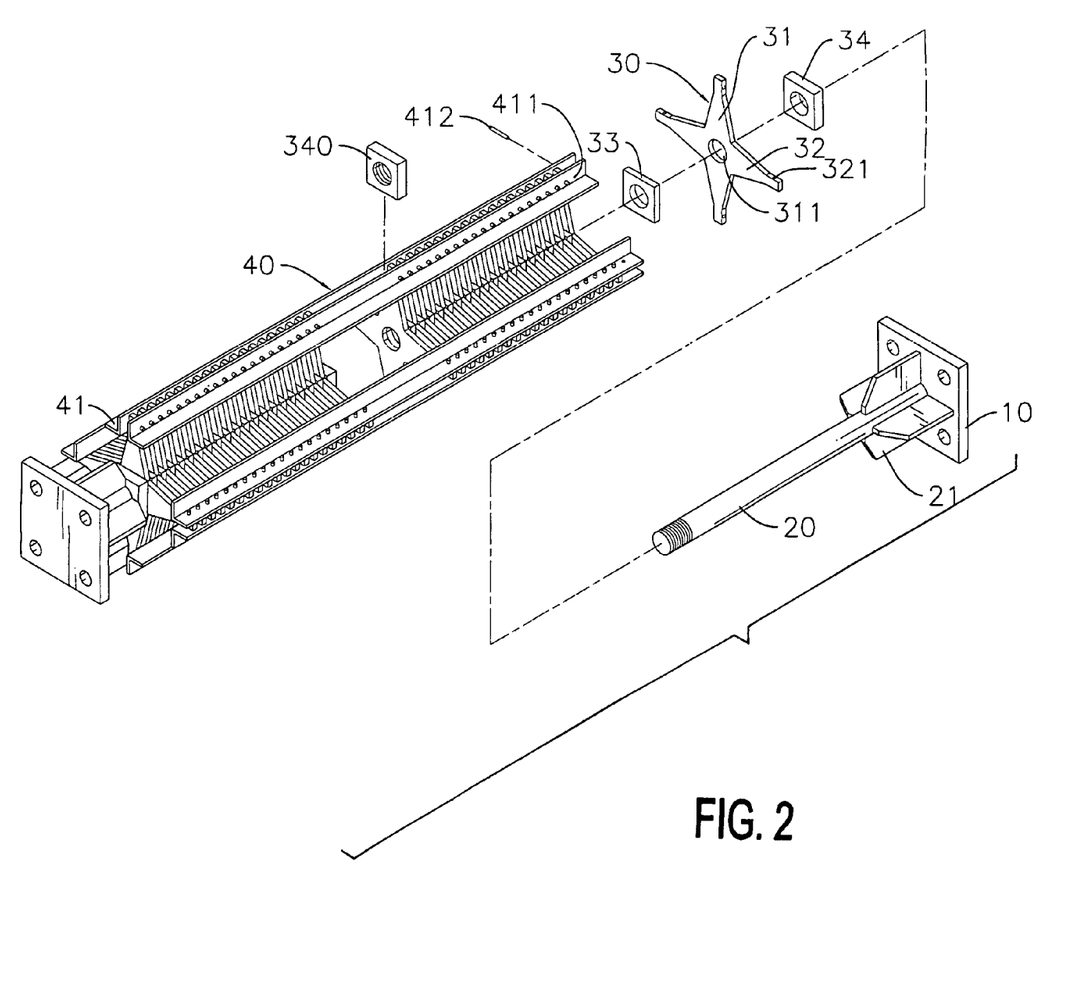
FIG. 2 is a partially exploded perspective view of the earthquake shock damper in FIG. 1.
Figure 6:
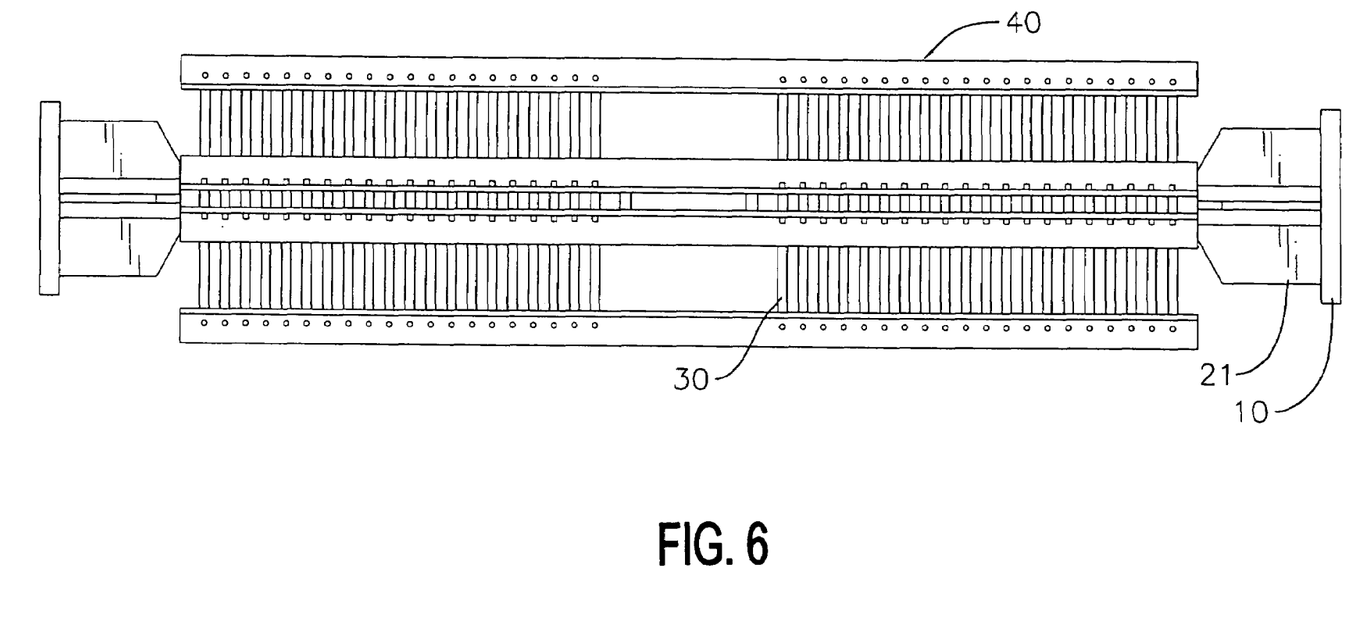
FIG. 6 is a side view of the earthquake shock damper in FIG. 1.

With reference to FIGS. 1, 2 and 6, an earthquake shock damper in accordance with the present invention comprises two connectors, two shaft assemblies (20), multiple energy absorbers (30), multiple spacers (33), multiple shaft fasteners (34, 340) and multiple energy distribution assemblies (40).

Figure 8:
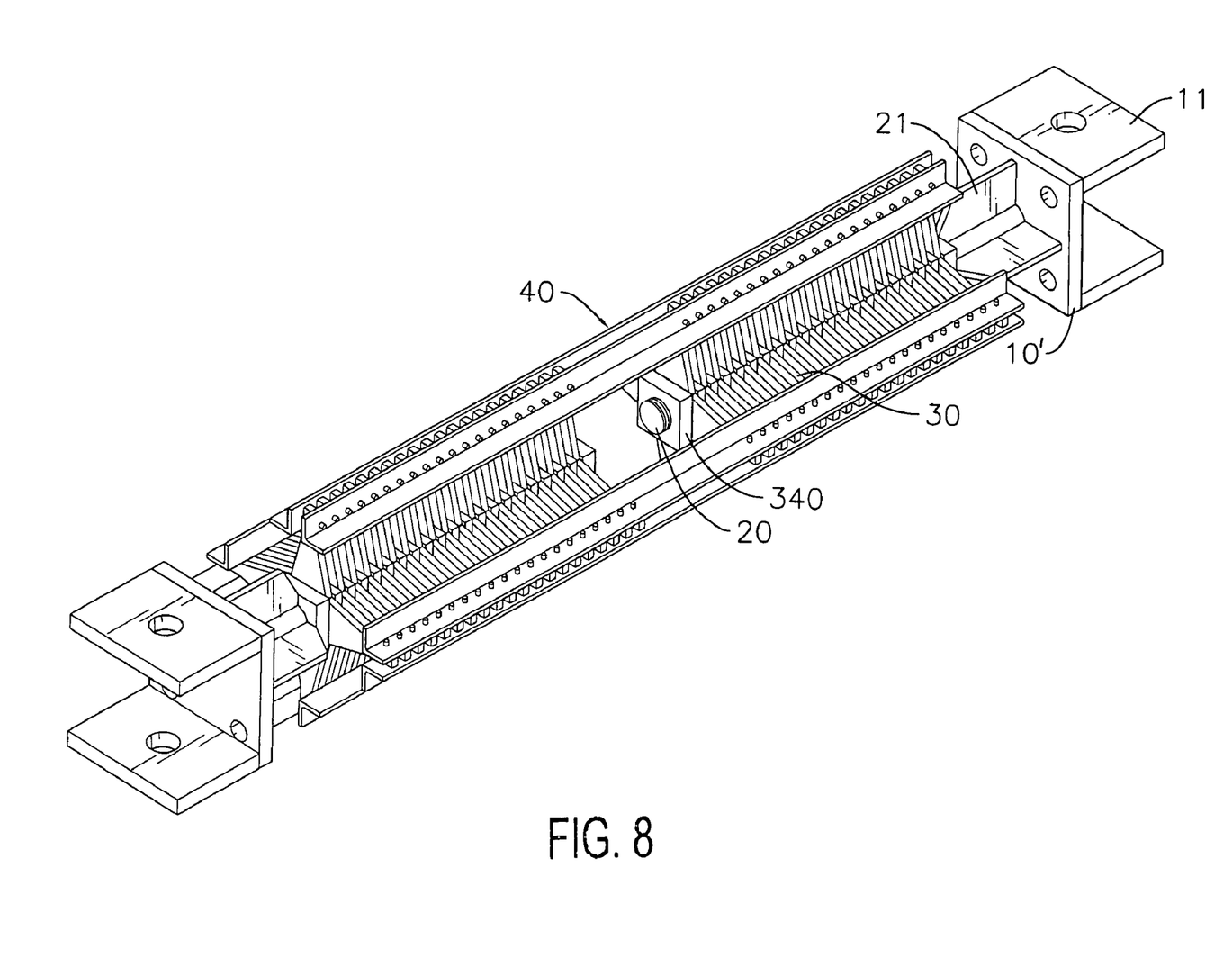
FIG. 8 is a perspective view of a third embodiment of an earthquake shock damper in accordance with the present invention.
Figure 9:
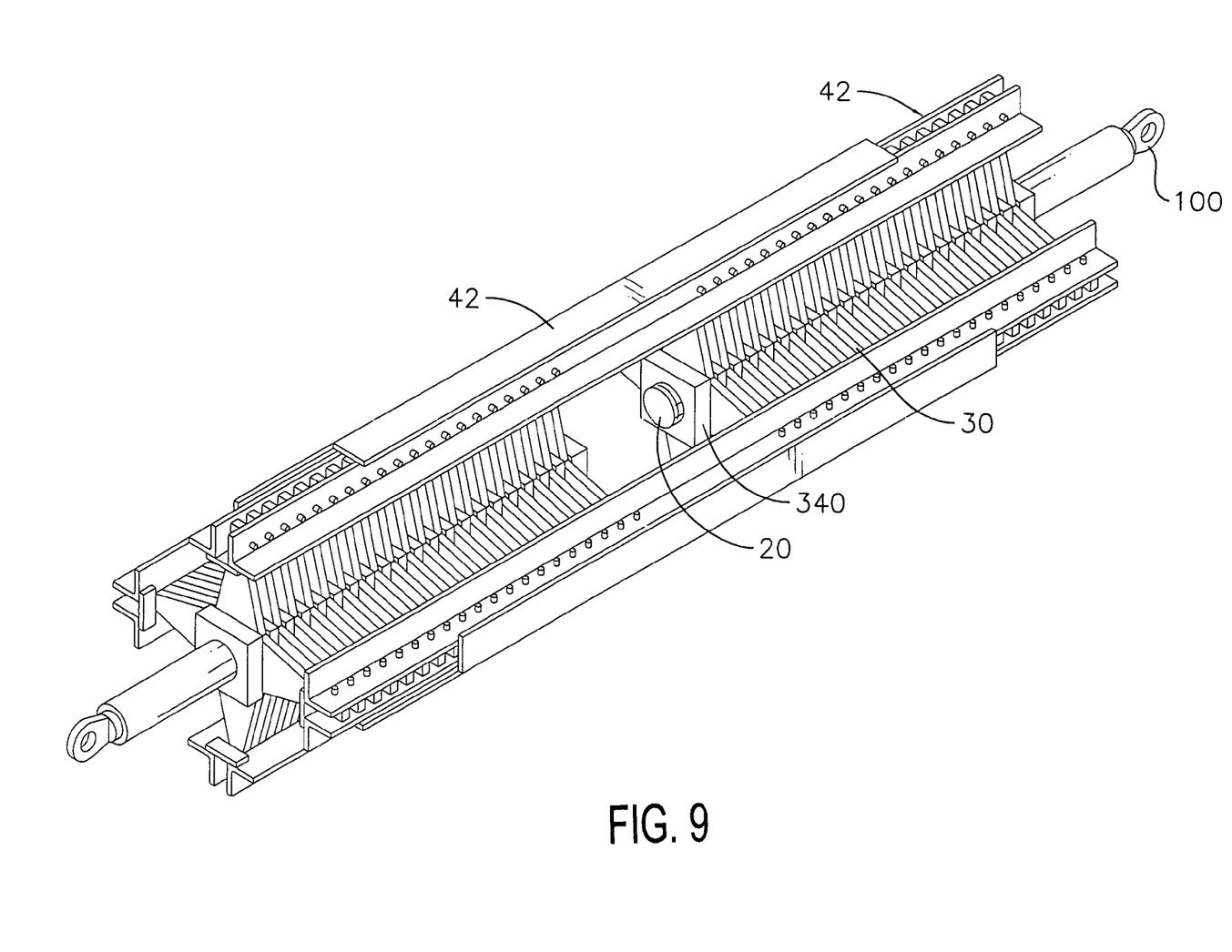
FIG. 9 is a perspective view of a fourth embodiment of an earthquake shock damper in accordance with the present invention.

With further reference to FIGS. 8 and 9, the connectors are connected to structural members of a building and may be mounting plates (10, 10') or eyes (100). Each mounting plate (10, 10') may have multiple mounting holes or two opposite edges and two extension plates (11). The mounting holes are formed through the mounting plates (10, 10') and are connected to a structural member of a building. The extension plates (11) are attached respectively to the edges of the mounting plate (10, 10') and protrude longitudinally to connect to or around structural members of a building. The eyes (100) are connected to structural members of a building.

Figure 10:
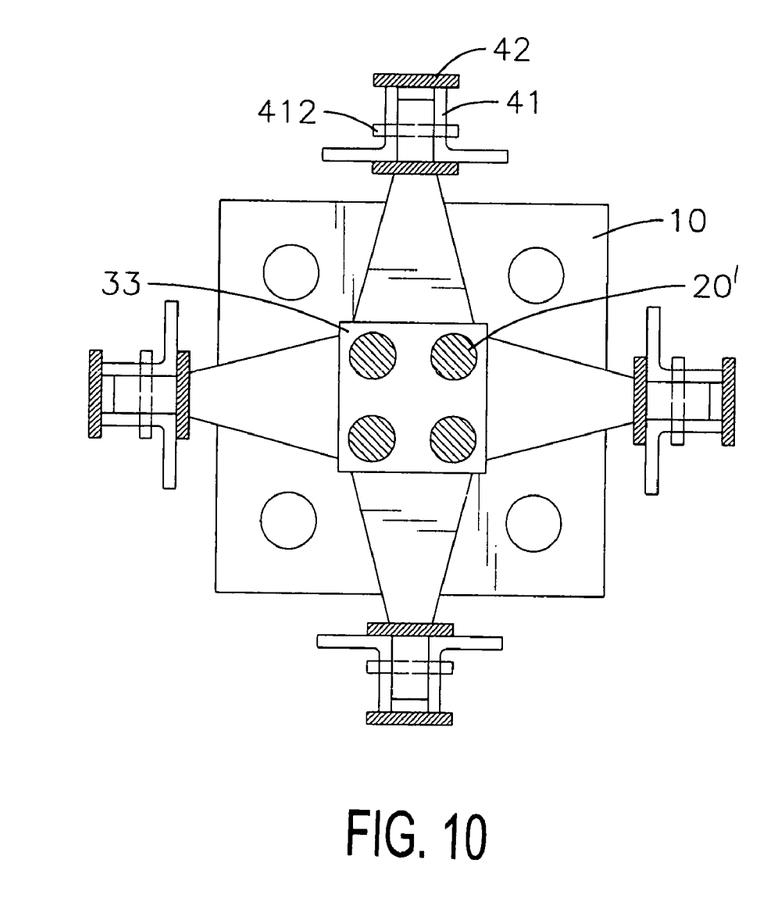
FIG. 10 is an end view of a fifth embodiment of an earthquake shock damper in accordance with the present invention.
Figure 11:
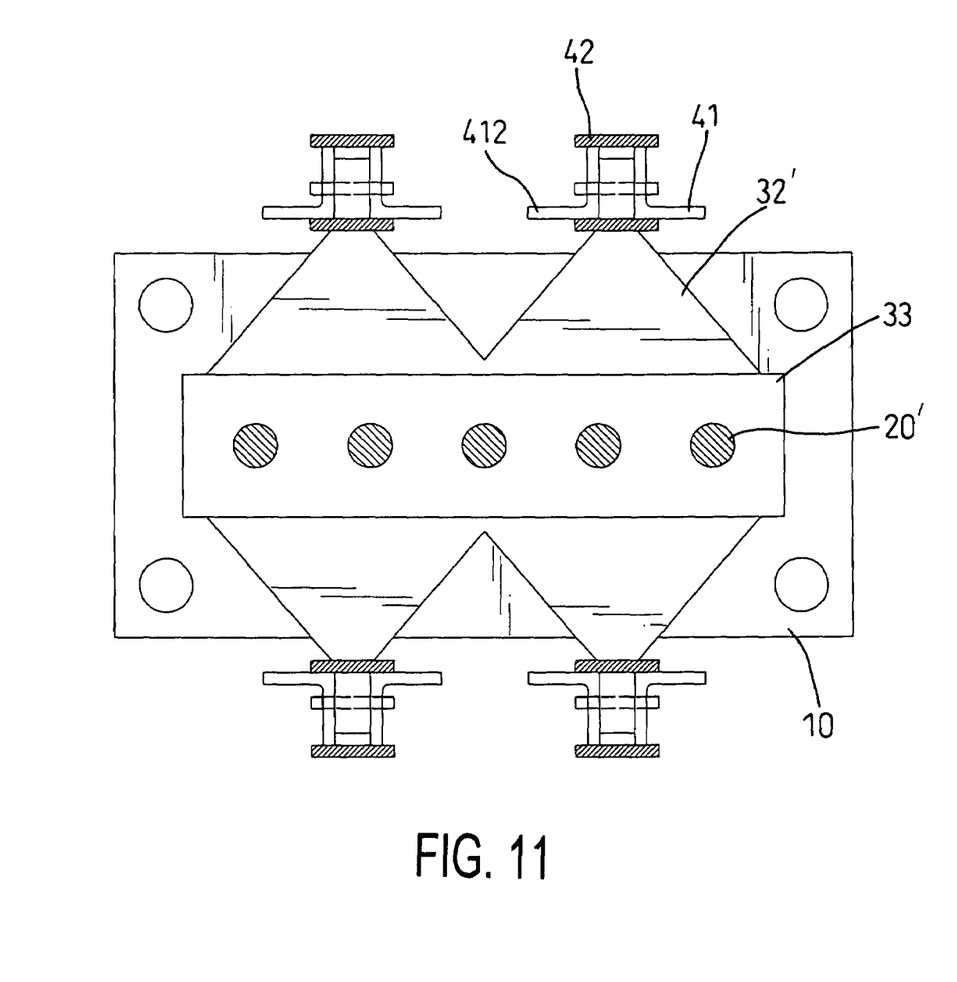
FIG. 11 is an end view of a sixth embodiment of an earthquake shock damper in accordance with the present invention.

With further reference to FIGS. 10 and 11, the shaft assemblies (20, 20') are coaxially attached respectively to the connectors. Each shaft assembly (20, 20') has a proximal end and a distal end and may have a single shaft or may have multiple shafts. The proximal end of each shaft assembly (20, 20') is attached to a connector. A single shaft may be attached to a mounting plate (10, 10') or an eye (100), has a proximal end and a distal end and may have a thread and multiple fins (21). The proximal end of the single shaft is attached to a mounting plate (10, 10') or an eye (100). The thread is formed on the distal end of the single shaft. The fins (21) are formed on and extend out radially from the proximal end of the single shaft and are attached to the mounting plate (10, 10').

Figure 3:
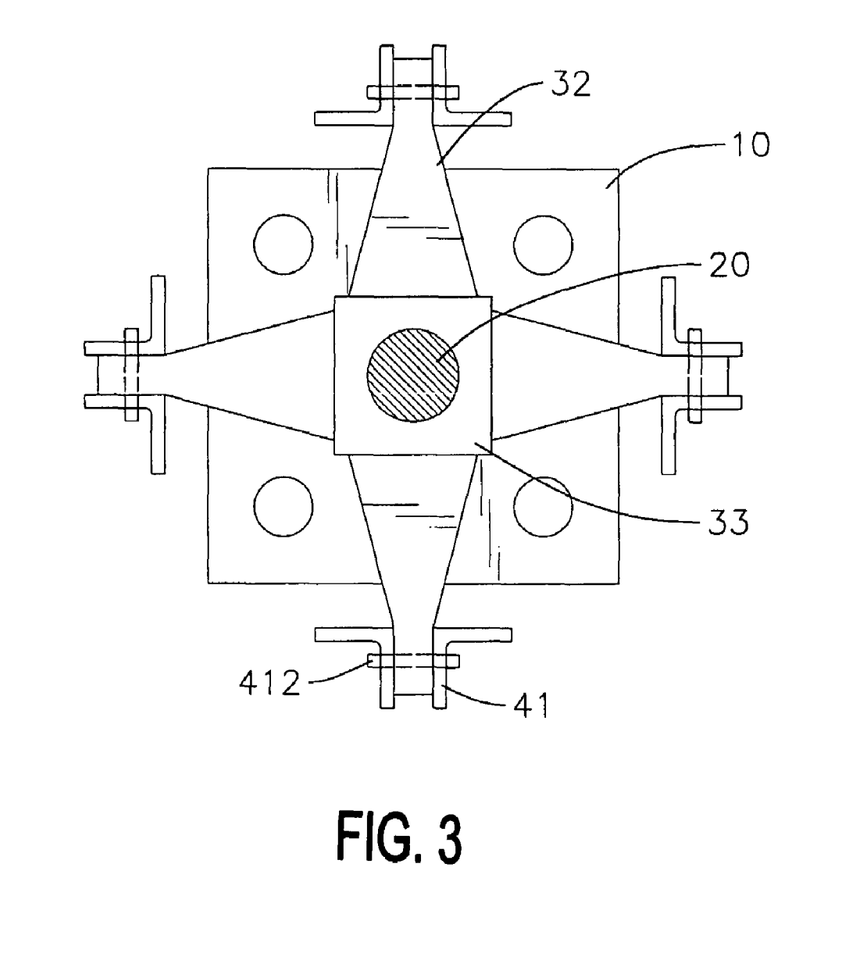
FIG. 3 is an end view in partial section of the earthquake shock damper in FIG. 1.

With further reference to FIG. 3, energy absorbers (30) are mounted respectively around the two shaft assemblies (20, 20'), and each energy absorber (30) has a central body (31) and multiple extensions (32, 32'). The central body (31) has at least one central hole (311). The central hole (311) is formed through the central body (31) and is mounted around the shaft assemblies (20, 20'). The extensions (32, 32') extend respectively in multiple directions from the central body (31), and each extension (32, 32') may have a distal end, two sides and a fastening hole (321). The fastening hole (321) is formed through the extension (32, 32') near the distal end.

The spacers (33) are mounted around the two shaft assemblies (20, 20') between the central bodies (31) respectively of adjacent energy absorbers (30).

The shaft fasteners (34, 340) are mounted on the two shaft assemblies (20, 20') respectively near the distal end and the proximal end of the shaft assemblies (20, 20') and clamp the energy absorbers (30) and the spacers (33) together. The shaft fastener (340) that is mounted on the distal end of the single shaft of a corresponding shaft assembly (20) may have a threaded hole. The threaded hole is formed through the shaft fastener (340) and corresponds to and screws onto the threaded part of the single shaft of the shaft assemblies (20, 20').

Figure 4:
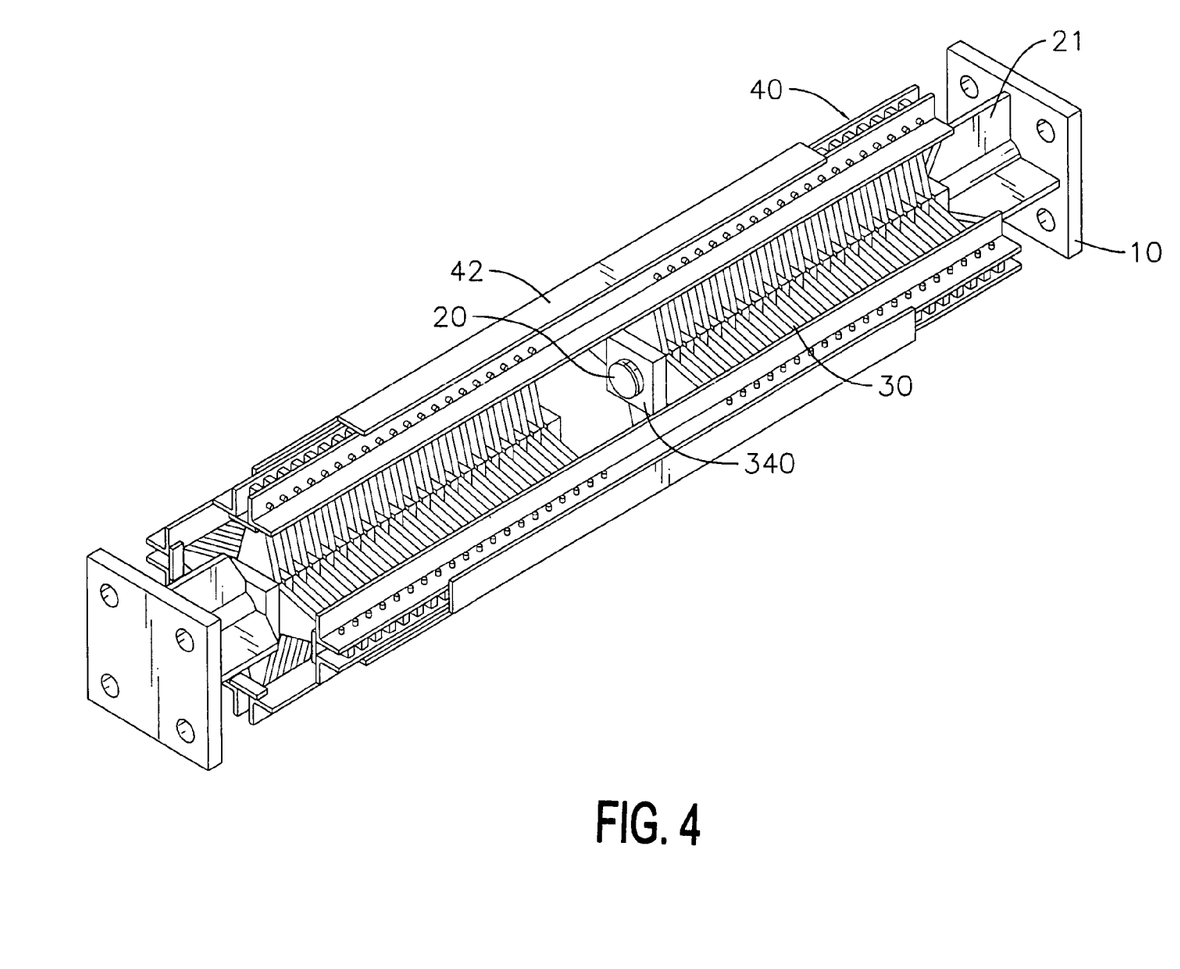
FIG. 4 is a perspective view of a second embodiment of an earthquake shock damper in accordance with the present invention.
Figure 5:
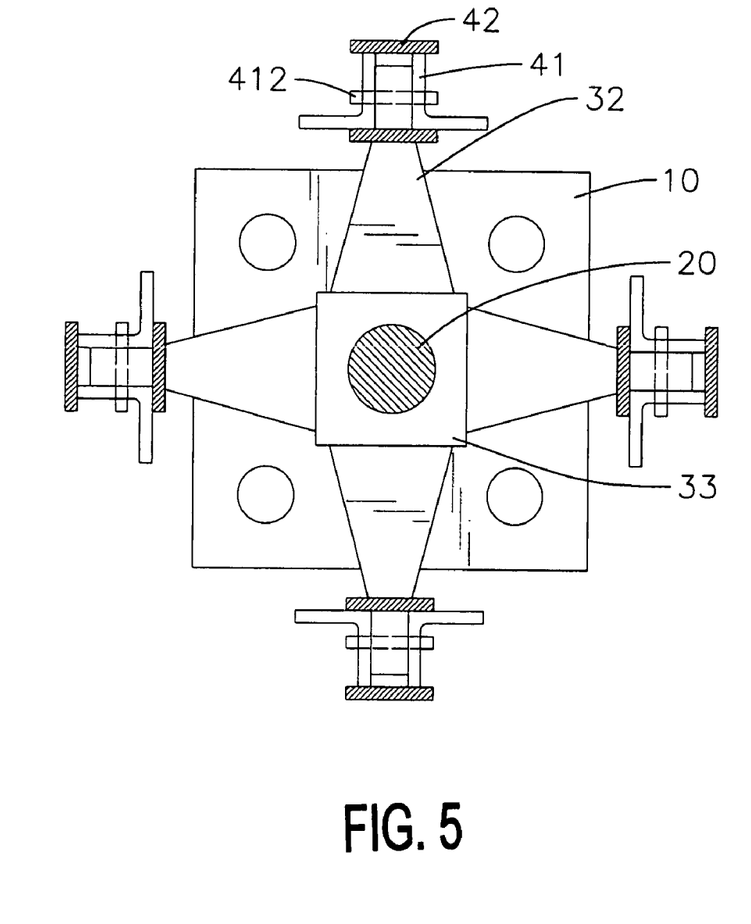
FIG. 5 is an end view in partial section of the earthquake shock damper in FIG. 4.

With further reference to FIGS. 4 and 5, the energy distribution assemblies (40) are attached to the extensions (32, 32') of the energy absorbers (30). Each energy distribution assembly (40) may have two angle irons (41) or a channel iron and may have multiple fasteners (412) and a distribution bar (42). The angle irons (41) are attached respectively to the two sides of each extension (32) of the energy absorber (30) near the distal end of the extension (32), and each angle iron (41) has multiple fastening holes (411) and a distal edge. The fastening holes (411) are formed through the angle iron (41) and correspond respectively to the fastening holes (321) in the extensions (32, 32') of the energy absorbers (30). The fasteners (412) extend respectively through and are mounted in the fastening holes (411, 321) in the angle irons (41) and extensions (32, 32') of the energy absorbers (30) and may be rivets, screws or the like. The distribution bar (42) is attached to the distal edge of the angle iron (41) to distribute energy more uniformly to each energy absorber (30).

Figure 7:
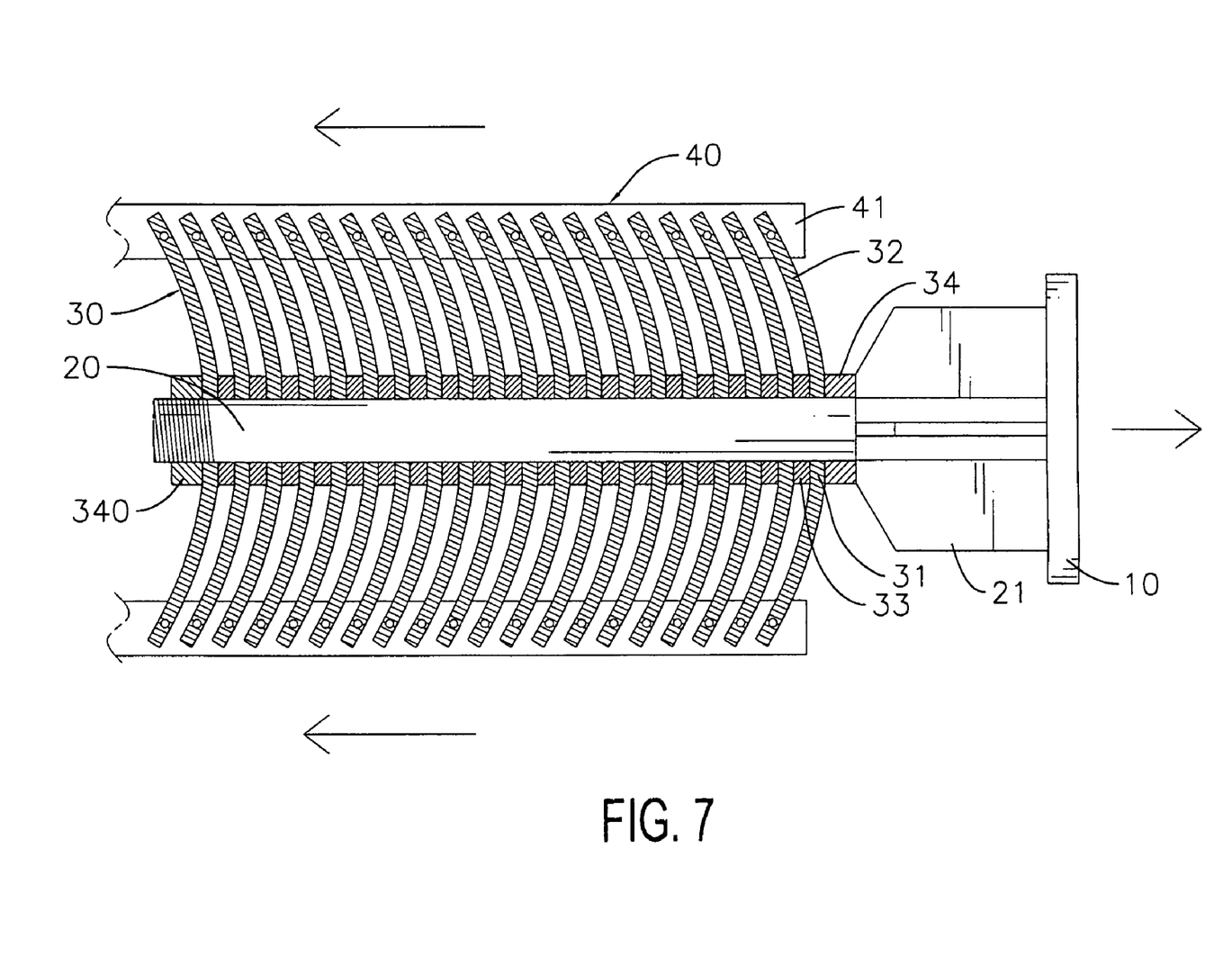
FIG. 7 is an operational side view of the earthquake shock damper in FIG. 1.

With further reference to FIG. 7, the energy absorbers (30) deform when subjected to the shock of an earthquake. The deformation of the energy absorbers (30) absorbs part of the shock energy of the earthquake to prevent the structure of buildings from being damaged or destroyed.

The earthquake shock damper as described has numerous advantages. Mounting the energy absorbers (30) around the shaft assemblies (20, 20') is simple and takes less time. Mounting the spacers (33) between the energy absorbers (30) to define the intervals between the energy absorbers (30) is also simple and takes less time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An earthquake shock damper comprising:
   two connectors;
   two shaft assemblies coaxially attached respectively to the connectors, and each shaft assembly having
      a proximal end attached to a corresponding one of the connectors; and
      a distal end;
   multiple energy absorbers mounted respectively around the two shaft assemblies, and each energy absorber having
      a central body having at least one central hole formed through the central body and mounted around a corresponding one of the shaft assemblies; and
      multiple extensions extending respectively in multiple directions from the central body;
   multiple spacers mounted around the two shaft assemblies between the central bodies respectively of adjacent energy absorbers and respectively separating the adjacent energy absorbers;
   multiple shaft fasteners mounted on the two shaft assemblies respectively near the distal end and the proximal end of the shaft assemblies and clamping the energy absorbers and the spacers together; and
   multiple energy distribution assemblies attached to the extensions of the energy absorbers.

2. The earthquake shock damper as claimed in claim 1, wherein each shaft assembly has a single shaft having a proximal end and a distal end.

3. The earthquake shock damper as claimed in claim 2, wherein the connectors are eyes attached respectively to the proximal ends of the single shafts of the shaft assemblies.

4. The earthquake shock damper as claimed in claim 2, wherein the connectors are mounting plates attached to the proximal ends of the single shafts of the shaft assemblies.

5. The earthquake shock damper as claimed in claim 4, wherein each mounting plates has multiple mounting holes formed through the mounting plates.

6. The earthquake shock damper as claimed in claim 5, wherein each mounting plate has
   two opposite edges; and
   two extension plates attached respectively to the edges of the mounting plate and protruding longitudinally.

7. The earthquake shock damper as claimed in claim 6, wherein the single shaft has multiple fins formed on and extending out radially from the proximal end of the single shaft and attached to the mounting plate.

8. The earthquake shock damper as claimed in claim 2, wherein
   the single shaft of each shaft assembly has a thread formed on the distal end of the single shaft; and
   each shaft fastener that is mounted on the distal end of the single shaft of a corresponding shaft assembly has a threaded hole formed through the shaft fastener and corresponding to and screwing onto the threaded part of the single shaft of the corresponding shaft assembly.

9. The earthquake shock damper as claimed in claim 1, wherein each shaft assembly has multiple shafts.

10. An earthquake shock damper comprising: two connectors;
   two shaft assemblies coaxially attached respectively to the connectors, and each shaft assembly having
      a proximal end attached to a corresponding one of the connectors; and
      a distal end;
   multiple energy absorbers mounted respectively around the two shaft assemblies, and each energy absorber having
      a central body having at least one central hole formed through the central body and mounted around a corresponding one of the shaft assemblies; and
      multiple extensions extending respectively in multiple directions from the central body;
   multiple spacers mounted around the two shaft assemblies between the central bodies respectively of adjacent energy absorbers;
   multiple shaft fasteners mounted on the two shaft assemblies respectively near the distal end and the proximal end of the shaft assemblies and clamping the energy absorbers and the spacers together; and
   multiple energy distribution assemblies attached to the extensions of the energy absorbers;
   wherein each extension of the energy absorbers has a distal end and two sides; and each energy distribution assembly has two angle irons attached respectively to the two sides of the extensions of the energy absorbers near the distal ends of the extensions, and each angle iron having a distal edge.

11. The earthquake shock damper as claimed in claim 10, wherein each extension has a fastening hole formed through the extension near the distal end;

each angle iron has multiple fastening holes formed separately through the angle iron and individually corresponding to the fastening holes in corresponding extensions of the energy absorbers; and multiple fasteners extending respectively through and mounted in the fastening holes in the angle irons and the corresponding extensions of the energy absorbers.

12. The earthquake shock damper as claimed in claim 11, wherein the fasteners are rivets.

13. The earthquake shock damper as claimed in claim 10, wherein each energy distribution assembly has a distribution bar attached to the distal edges of corresponding angle irons.

* * * * *